(12) United States Patent
Zhu et al.

(10) Patent No.: US 11,437,640 B2
(45) Date of Patent: Sep. 6, 2022

(54) METHOD OF MAKING AN ELECTROCHEMICAL CELL

(71) Applicant: Hamilton Sundstrand Corporation, Charlotte, NC (US)

(72) Inventors: Tianli Zhu, Glastonbury, CT (US); Michael Paul Humbert, Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 306 days.

(21) Appl. No.: 16/531,357

(22) Filed: Aug. 5, 2019

(65) Prior Publication Data
US 2021/0043956 A1 Feb. 11, 2021

(51) Int. Cl.
*H01M 8/1226* (2016.01)
*H01M 4/04* (2006.01)
*H01M 4/134* (2010.01)
*H01M 10/0525* (2010.01)

(52) U.S. Cl.
CPC ....... *H01M 8/1226* (2013.01); *H01M 4/0404* (2013.01); *H01M 4/134* (2013.01); *H01M 10/0525* (2013.01)

(58) Field of Classification Search
CPC . H01M 4/0402; H01M 4/0404; H01M 8/1226
See application file for complete search history.

(56) References Cited

U.S. PATENT DOCUMENTS

| 8,283,077 | B1 | 10/2012 | Visco et al. |
| 9,089,862 | B2 | 7/2015 | Cotler et al. |
| 9,174,841 | B2 | 11/2015 | Hwang et al. |
| 9,334,194 | B2 | 5/2016 | Raj et al. |
| 9,496,559 | B2 | 11/2016 | Hwang et al. |
| 9,692,075 | B1 * | 6/2017 | Lee ...................... H01M 4/8621 |
| 2010/0178588 | A1 * | 7/2010 | White ................. H01M 4/9033 429/495 |
| 2011/0003084 | A1 | 1/2011 | Berghaus et al. |
| 2012/0164552 | A1 * | 6/2012 | Kobayashi ............ H01M 4/861 429/480 |
| 2013/0045437 | A1 * | 2/2013 | Chen ................... H01M 4/8647 429/527 |

(Continued)

FOREIGN PATENT DOCUMENTS

| CN | 101183716 A | 5/2008 |
| EP | 3410524 A1 | 12/2018 |
| JP | 2010250965 A | 11/2010 |

OTHER PUBLICATIONS

Extended European Search Report issued in Application No. 19216322.8 dated Jun. 30, 2020, 7 pages.

(Continued)

*Primary Examiner* — Matthew J Merkling

(74) *Attorney, Agent, or Firm* — Cantor Colburn LLP

(57) ABSTRACT

Disclosed is a method of making an electrochemical cell, comprising: depositing an anode layer on a surface of a porous metal support layer; depositing an electrolyte layer on a surface of the anode layer, wherein the electrolyte layer is deposited via suspension plasma spray, wherein the electrolyte layer conducts protons; and depositing a cathode layer on a surface of the electrolyte layer. Also disclosed is a stack comprising two or more of the electrochemical cell.

20 Claims, 2 Drawing Sheets

(56) References Cited

U.S. PATENT DOCUMENTS

| | | | |
|---|---|---|---|
| 2014/0051006 A1 | 2/2014 | Hwang et al. | |
| 2015/0044597 A1* | 2/2015 | Hiraiwa | C04B 35/48 |
| | | | 429/496 |
| 2016/0040303 A1* | 2/2016 | Gershon | C25B 1/55 |
| | | | 205/340 |
| 2016/0190614 A1 | 6/2016 | Striker et al. | |
| 2016/0204446 A1* | 7/2016 | Higashino | H01M 8/126 |
| | | | 429/409 |
| 2018/0166678 A1 | 6/2018 | Puranen et al. | |
| 2018/0205094 A1 | 7/2018 | Puranen et al. | |
| 2018/0323443 A1 | 11/2018 | Tucker et al. | |
| 2019/0088970 A1* | 3/2019 | Liu | H01M 4/9033 |

OTHER PUBLICATIONS

Hugo J. Avila-Paredes et al., "Room-temperature protonic conduction in nanocrystalline films of yttria-stabilized zirconia", Journal of Materials Chemistry, vol. 20, 2010, 4 pgaes.

* cited by examiner

METHOD OF MAKING AN ELECTROCHEMICAL CELL

STATEMENT OF FEDERAL SUPPORT

This invention was made with Government support under contract DE-EE0008080 awarded by the Department of Energy. The Government has certain rights in the invention.

BACKGROUND

Exemplary embodiments pertain to the art of electrochemical cells, more particularly, to a method of making an electrochemical cell using suspension plasma spray.

Oxide fuel cells have many potential applications. For example, in the aerospace industry, potential applications include electrolysis, auxiliary power generation, and aircraft propulsion. For example, solid oxide fuel cells are compatible with hydrocarbon fuels, such as methane, ethanol, and jet fuels. Metal-supported electrochemical cell stacks, enabled by proton-conducting electrolyte materials, can also provide fast startup times, fast transit response, and high power density. However, solid oxide fuel cell technology is often very costly to manufacture.

Therefore, there is a need to develop a method of manufacturing electrochemical fuel cells, such as solid oxide fuel cells, which is more efficient and less costly.

BRIEF DESCRIPTION

Disclosed is a method of making an electrochemical cell, comprising: depositing an anode layer on a surface of a porous metal support layer; depositing an electrolyte layer on a surface of the anode layer, wherein the electrolyte layer is deposited via suspension plasma spray, wherein the electrolyte layer conducts protons; and depositing a cathode layer on a surface of the electrolyte layer.

Also disclosed is a stack comprising two or more of the electrochemical cell.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
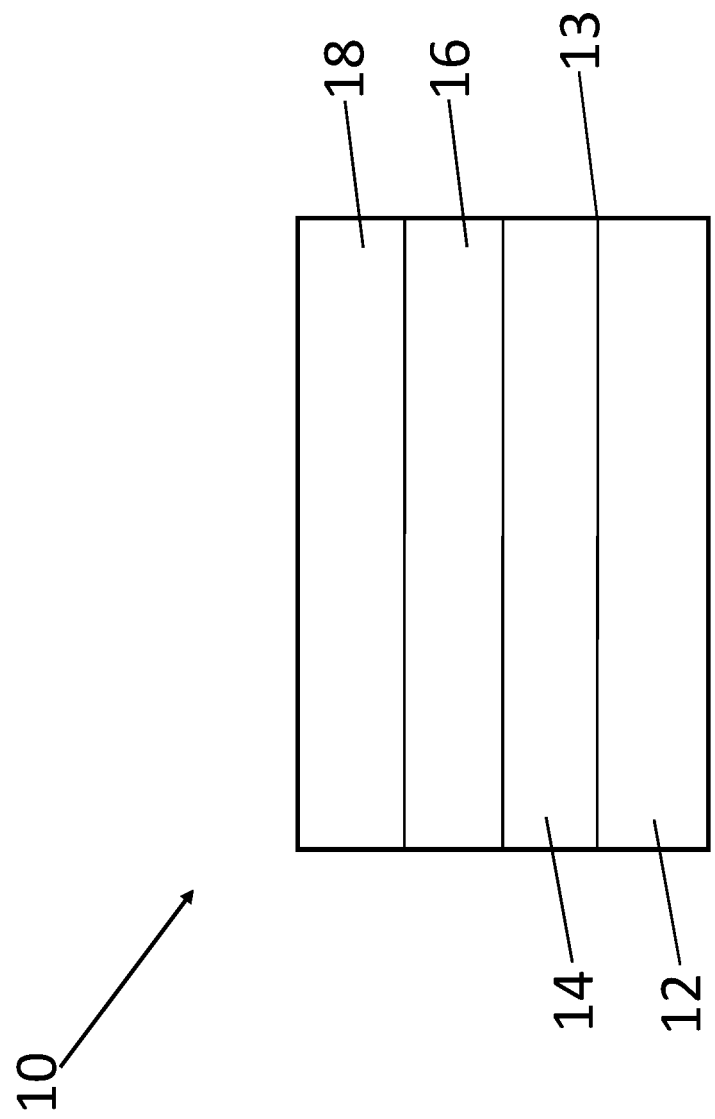
FIG. 1 is a simplified diagram representing an electrochemical cell according to an exemplary embodiment.

Referring to FIG. 1, an electrochemical cell 10 can include a porous metal support layer 12, an oxide protection layer 13, an anode layer 14, an electrolyte layer 16, and a cathode layer 18. For example, the electrochemical cell can be a solid oxide fuel cell, a solid oxide electrolysis cell, or a combination thereof.

The porous metal support layer 12 can comprise metal materials, metal ceramic composite materials, or combinations thereof. For example, the porous metal support layer 12 can comprise nickel, iron nickel alloy, nickel chromium aluminum yttrium, stainless steel, for example, ferritic stainless steel, or any combination thereof. The porous metal support layer 12 can have a porosity of about 10% to about 50% based on a total volume of the porous metal support layer 12. Porosity can be measured using any suitable means, for example, electron microscopy, for example, transmission electron microscopy or scanning electron microscopy.

An anode layer 14 can be deposited on a surface of the porous metal support layer 12. The anode layer 14 can comprise metal materials, metal ceramic composite materials, or combinations thereof. For example, the anode layer 14 can comprise nickel oxide and a ceramic electrolyte material. The anode layer 14 can comprise a porous structure. For example, the anode layer 14 can comprise a mixture of porous nickel oxide and electrolyte material. An oxidation protection layer 13 can also be deposited in between the anode layer 14 and the porous metal support layer 12. For example, the oxide protection layer 13 can comprise a metal oxide, for example, copper manganese oxide.

The anode layer 14 can be deposited on a surface of the metal support layer 12 via suspension plasma spray or auxiliary plasma spray. For example, in a suspension plasma spray, a powdered form of the metal and/or ceramic anode materials can be suspended in a liquid (e.g., aqueous or organic). The powder particles can be heated (e.g., sintered) until they reach a molten state. The resulting material can then be jetted onto the desired surface. The use of finer powders can result in finer microstructures and thinner layers. For example, the suspension plasma spray can comprise particles less than 15 micrometers in average diameter, for example, about 1 micrometer to about 15 micrometers in average diameter. Average diameter can be measured using any suitable means, for example, electron microscopy, for example, transmission electron microscopy or scanning electron microscopy. Suspension plasma spray can result in layers that are, for example, less than or equal to 100 micrometers thick, for example, about 10 micrometers to about 50 micrometers thick.

In an auxiliary plasma spray method, only the powder is used (i.e. no liquid suspension). Use of auxiliary plasma spray can result in coarser microstructures and thicker layers. For example, the auxiliary plasma spray can comprise particles about 10 micrometers to about 100 micrometers in average diameter, for example, about 20 micrometers to about 30 micrometers in average diameter, as measured by, for example, transmission electron microscopy. The suspension plasma spray and the auxiliary plasma spray can be applied via dual jetting nozzles. For example, dual jetting nozzles can be used when a layer being deposited comprises two or more components (e.g., anode layer 14).

An electrolyte layer 16 can be deposited on a surface of the anode layer 14. For example, the electrolyte layer 16 can be deposited on a surface of the anode layer 14 via suspension plasma spray. The electrolyte layer 16 can be proton conducting. For example, the proton conducting nature of the electrolyte layer 16 can allow the electrochemical cell 10 to be used for electrolysis. The electrolyte layer 16 can comprise metal materials, ceramic composite materials, or combinations thereof. The electrolyte layer 16 can comprise barium compounds doped with one or more additional materials (e.g., a perovskite structure). For example, the electrolyte layer 16 can comprise yttrium doped barium zirconate, cerium doped barium yttrium zirconate, cerium/ytterbium doped barium yttrium zirconate, yttrium/tin doped barium zirconate, or a combination thereof. For example, doping levels for the electrolyte layer 16 can be about 5% to about 20% yttrium, about 20% to about 80% cerium, or combinations thereof. A stoichiometric ratio for these compounds can include barium in a stoichiometric amount of 1.0, for example, $Ba_{1.0}Y_{0.2}Zr_{0.8}O_3$. The electrolyte layer 16 can comprise greater than or equal to 35% barium by weight based on a total weight of the electrolyte layer 16, for example, greater than or equal to 40% barium by weight, for example, about 35% to about 55% barium by weight.

Barium can be lost during the suspension plasma spray process. In order to compensate for this loss, and ensure that a suitable amount of barium is present in the final electrolyte layer 16, excess barium can be added to the suspension plasma spray before the electrolyte layer 16 is deposited. For example, excess barium can be added directly to a BYZ perovskite compound used in the suspension plasma spray. For example, if $Ba_{1.0}Y_{0.2}Zr_{0.8}O_3$ is desired in the final electrolyte layer 16, then $Ba_{1.0+x}Y_{0.2}Zr_{0.8}O_3$ can be used in the suspension plasma spray, wherein x is 0.1 to 0.3, for example, about 0.2. Additionally, or alternatively, excess barium in the form of barium carbonate, barium hydroxide, or combinations thereof, can be added to the suspension plasma spray before deposition on the anode layer 14. For example, the amount of barium by weight in the suspension plasma spray can be 10% to 30% greater, for example, about 20% greater, than the amount of barium desired in the final electrolyte layer 16.

A cathode layer 18 can be deposited on a surface of the electrolyte layer 16. For example, the cathode layer 18 can be deposited via any suitable method, for example, suspension plasma spray, auxiliary plasma spray, slurry application, or a combination thereof. In an embodiment, both the anode layer and the cathode layer are deposited via suspension plasma spray. The cathode layer can comprise perovskite minerals and/or barium oxides. For example, the cathode layer can comprise $Ba_{0.5}Pr_{0.5}CoO_3$, $Ba_{0.5}Sr_{0.5}Co_{0.8}Fe_{0.2}O_3$, $Ba(Ce_{1-x}Bi_x)O_3$, $PrBa_{0.5}Sr_{0.5}Co_{1.5}Fe_{0.5}O_{5+\delta}$, or a combination thereof.

Figure 2:
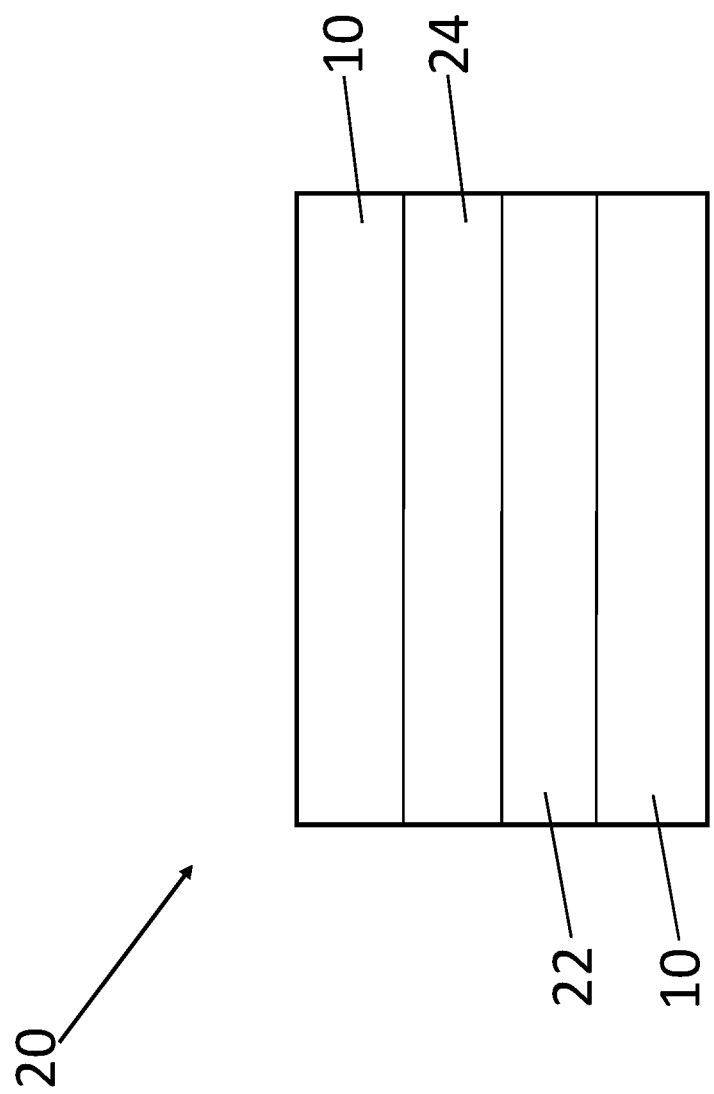
FIG. 2 is a simplified diagram representing an electrochemical cell stack according to an exemplary embodiment.

Referring to FIG. 2, a stack 20 can include two or more of the electrochemical cell 10, a metal mesh layer 22, and a flow channel layer 24. For example, the stack 20 can include a metal mesh layer 22 deposited in between two electrochemical cells 10. The stack 20 can include a flow channel layer deposited in between two electrochemical cells 10.

The electrochemical cell 10 and/or stack 20 has many useful applications. For example, the electrochemical cell 10 and/or stack 20 can be used in reverse for steam electrolysis. Electrolysis can be a highly efficient and cost competitive process for hydrogen generation when coupled with nuclear power or renewable sources such as wind or solar. The electrochemical cell 10 and/or stack 20 has applications in aerospace such as auxiliary power generation and aircraft propulsion. For example, the electrochemical cell 10 and/or stack 20 is compatible with hydrocarbon fuels, such as methane, ethanol, and jet fuels. The electrochemical cell 10 and/or stack 20 can come into contact with a hydrocarbon fuel during use. An operating temperature of the electrochemical cell 10 and/or stack 20 can be less than or equal to 700° C. (1292° F.), for example, about 500° C. (932° F.) to about 650° C. (1202° F.). The electrochemical cell 10 and/or stack 20, enabled by proton-conducting electrolyte materials, can also provide fast startup times, fast transit response, and high power density.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components (and encompasses "consist(s) of", "consisting of", "consist(s) essentially of" and "consisting essentially of"), but do not necessarily preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making an electrochemical cell, comprising:
    depositing an anode layer on a surface of a porous metal support layer, wherein the porous metal support layer has a porosity of 20% to 50% based on a total volume of the porous metal support layer and the anode layer comprises a mixture of porous nickel oxide and an electrolyte material comprising barium in a stoichiometric amount of 1.0;
    depositing an electrolyte layer on a surface of the anode layer, wherein the electrolyte layer comprises barium in a stoichiometric amount of 1.0,
    wherein the electrolyte layer is deposited via suspension plasma spray, wherein the electrolyte layer conducts protons, and wherein the suspension plasma spray includes 10% to 30% greater barium by weight than a desired amount of barium in the formed electrochemical cell, and wherein the barium of the suspension plasma spray is of the compound $Ba_{1.0+x}Y_{0.2}Zr_{0.8}O_3$ wherein x is between 0.1 to 0.3; and
    depositing a cathode layer on a surface of the electrolyte layer.

2. The method of claim 1, wherein the electrochemical cell is a solid oxide fuel cell, a solid oxide electrolysis cell, or a combination thereof.

3. The method of claim 1, wherein the anode layer is deposited via suspension plasma spray or auxiliary plasma spray.

4. The method of claim 1, further comprising depositing an oxidation protection layer in between the anode layer and the metal support layer.

5. The method of claim 1, wherein the anode layer comprises a porous structure.

6. The method of claim 1, wherein the barium in the electrolyte layer is of the compound $Ba_{1.0}Y_{0.2}Zr_{0.8}O_3$.

7. The method of claim 1, wherein electrolyte layer comprises greater than or equal to 35% barium by weight based on a total weight of the electrolyte layer.

8. The method of claim 1, wherein the electrolyte layer comprises yttrium doped barium zirconate, cerium doped barium yttrium zirconate, cerium/ytterbium doped barium yttrium zirconate, yttrium/tin doped barium zirconate, or a combination thereof.

9. The method of claim 1, wherein the cathode layer comprises a perovskite mineral.

10. The method of claim 9, wherein the cathode layer comprises $Ba_{0.5}Pr_{0.5}CoO_3$, $Ba_{0.5}Sr_{0.5}Co_{0.8}Fe_{0.2}O_3$, $Ba(Ce_{1-x}Bi_x)O_3$, $PrBa_{0.5}Sr_{0.5}Co_{1.5}Fe_{0.5}O_{5+\delta}$, or a combination thereof.

11. The method of claim 1, wherein the cathode layer is deposited via suspension plasma spray, auxiliary plasma spray, or slurry application.

12. The method of claim 1, wherein the anode layer and the cathode layer are deposited via suspension plasma spray.

13. The method of claim 1, wherein depositing of, at least, the anode layer occurs via dual jetting nozzles.

14. The method of claim 1, wherein the materials of the anode layer, the electrolyte layer, and the cathode layer are selected to form the electrochemical cell having an operating temperature of about 500° C. to about 700° C.

15. The method of claim 1, wherein the suspension plasma spray comprises particles about 1 micrometers to about 15 micrometers in average diameter, as measured by electron microscopy.

16. The method of claim 1, wherein the suspension plasma spray comprises a powder suspended in a liquid.

17. A stack comprising two or more of the electrochemical cell of claim 1.

18. The stack of claim 17, further comprising a metal mesh layer deposited between two electrochemical cells.

19. The stack of claim 17, further comprising a flow channel layer deposited between two electrochemical cells.

20. The stack of claim 17, further comprising a hydrocarbon fuel in contact with the stack.

* * * * *